US009852079B2

(12) United States Patent
Kepner et al.

(10) Patent No.: US 9,852,079 B2
(45) Date of Patent: Dec. 26, 2017

(54) EXTREME VIRTUAL MEMORY

(75) Inventors: Jeremy Kepner, Cambridge, MA (US);
Hahn Kim, Somerville, MA (US);
Crystal Kahn, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 455 days.

(21) Appl. No.: 12/374,815

(22) PCT Filed: Jul. 24, 2007

(86) PCT No.: PCT/US2007/016627
§ 371 (c)(1),
(2), (4) Date: Jan. 23, 2009

(87) PCT Pub. No.: WO2008/016515
PCT Pub. Date: Feb. 7, 2008

(65) Prior Publication Data
US 2009/0313449 A1    Dec. 17, 2009

Related U.S. Application Data

(60) Provisional application No. 60/835,143, filed on Aug. 1, 2006.

(51) Int. Cl.
| | | |
|---|---|---|
| G06F 12/00 | (2006.01) | |
| G06F 13/00 | (2006.01) | |
| G06F 13/28 | (2006.01) | |
| G06F 12/0897 | (2016.01) | |

(52) U.S. Cl.
CPC ................ *G06F 12/0897* (2013.01)

(58) Field of Classification Search
CPC .................................................. G06F 12/0897
USPC ........................................ 711/117, 202, 173
See application file for complete search history.

(56) References Cited

U.S. PATENT DOCUMENTS

| | | | | |
|---|---|---|---|---|
| 5,249,282 A | * | 9/1993 | Segers | G06F 12/0897 711/122 |
| 5,341,483 A | * | 8/1994 | Frank et al. | 711/206 |
| 5,390,318 A | * | 2/1995 | Ramakrishnan et al. | 711/158 |
| 5,440,686 A | * | 8/1995 | Dahman et al. | 345/537 |
| 5,606,686 A | * | 2/1997 | Tarui | G06F 12/0813 711/121 |
| 5,627,990 A | * | 5/1997 | Cord et al. | 711/122 |
| 5,659,743 A | * | 8/1997 | Adams et al. | |

(Continued)

FOREIGN PATENT DOCUMENTS

| | | | |
|---|---|---|---|
| WO | WO 02069151 | * | 9/2002 |
| WO | WO 02069151 A | | 9/2006 |

OTHER PUBLICATIONS

Kim et al. "Parallel MATLAB for Extreme Virtual Memory," IEEE, Jun. 2005, pp. 1-7.*

(Continued)

*Primary Examiner* — Sheng-Jen Tsai

(57) ABSTRACT

A method and computer program product for orchestrating the distribution and management of parallel data on a parallel hierarchical storage system is presented. A hierarchical map of the parallel data is provided. The hierarchical map comprises a plurality of map objects, wherein each map object describes how to partition a given array of data into a plurality of subarrays of data created by a parent map object of the map object and how to store the parallel data into the parallel computer's storage hierarchy.

17 Claims, 11 Drawing Sheets

(56) References Cited

U.S. PATENT DOCUMENTS

| | | | | |
|---|---|---|---|---|
| 5,717,893 | A * | 2/1998 | Mattson | 711/129 |
| 5,809,525 | A * | 9/1998 | Bishop et al. | 711/122 |
| 5,860,078 | A * | 1/1999 | Emmot | 711/3 |
| 5,895,487 | A * | 4/1999 | Boyd et al. | 711/122 |
| 5,918,229 | A * | 6/1999 | Davis et al. | 705/27.1 |
| 6,449,695 | B1 * | 9/2002 | Bereznyi et al. | 711/134 |
| 6,886,085 | B1 * | 4/2005 | Shuf et al. | 711/159 |
| 6,981,096 | B1 * | 12/2005 | Matick et al. | 711/122 |
| 7,225,211 | B1 * | 5/2007 | Colgrove et al. | 707/693 |
| 8,280,853 | B1 * | 10/2012 | Lai et al. | 707/651 |
| 2002/0007440 | A1 * | 1/2002 | Hosoya et al. | 711/122 |
| 2002/0062418 | A1 * | 5/2002 | Luick | 711/3 |
| 2002/0120763 | A1 * | 8/2002 | Miloushev et al. | 709/230 |
| 2003/0005237 | A1 * | 1/2003 | Dhong et al. | 711/146 |
| 2003/0115282 | A1 * | 6/2003 | Rose | 709/214 |
| 2004/0117410 | A1 * | 6/2004 | Dietterich et al. | 707/200 |
| 2004/0225700 | A1 * | 11/2004 | Sohm | 708/400 |
| 2005/0015378 | A1 * | 1/2005 | Gammel | G06F 12/1009 |
| 2005/0125592 | A1 * | 6/2005 | Sawdey | 711/3 |
| 2006/0010432 | A1 * | 1/2006 | Iwashita | 717/136 |
| 2006/0101025 | A1 * | 5/2006 | Tichy et al. | 707/100 |
| 2006/0112233 | A1 * | 5/2006 | Hu et al. | 711/138 |
| 2006/0123197 | A1 * | 6/2006 | Dunshea et al. | 711/118 |
| 2006/0143396 | A1 * | 6/2006 | Cabot | G06F 12/121 |
| | | | | 711/134 |
| 2006/0179267 | A1 * | 8/2006 | Chatterjee et al. | 712/11 |
| 2007/0198986 | A1 * | 8/2007 | Panziera | 718/105 |
| 2007/0220029 | A1 * | 9/2007 | Jones et al. | 707/101 |
| 2007/0283125 | A1 * | 12/2007 | Manczak et al. | 711/207 |
| 2008/0256090 | A1 * | 10/2008 | Dietterich et al. | 707/10 |
| 2012/0042138 | A1 * | 2/2012 | Eguchi et al. | 711/154 |

OTHER PUBLICATIONS

Hanh Kim et al Parallel MATLAB for Extreme Virtual Memory Users Group Conference, 2005 Nashville, TN USA Jun. 27-30, 2005, Piscataway, NJ USA. IEEE, Jun. 27, 2005 pp. 381-387, XP010943796 ISBN: 0-7695-2496-6.

Hahn Kim, "Parallel MATLAB for Extreme Virtual Memory" Proceedings of the Users Group Conference, the United States of America, IEEE, Jun. 27, 2005, pp. 381-387.

\* cited by examiner

```
MATLAB
1:  vector = zeros(16, 1); // Create matrix
2:  ...                     // Process vector
```
```
pMatlab
1:  global_map = map([4 1], {}, 0:3);   // Create map
2:  vector = zeros(16, 1, global_map);  // Create matrix
3:  ...                                  // Process vector
```
```
pMatlab XVM
1:  ooc_map = map([2 1], {}, {});               // Create out-of-core map
2:  global_map = map([4 1], {}, 0:3, ooc_map);  // Create global map
3:  vector = zeros(16, 1, global_map);          // Create matrix
4:  ...                                          // Process vector
```

*Figure 4*

EXTREME VIRTUAL MEMORY

CROSS REFERENCE TO RELATED APPLICATIONS

This Patent Application claims priority to International Application PCT/US07/16627 filed on Jul. 24, 2007 which claims priority to U.S. Provisional Patent Application No. 60/835,143, filed on Aug. 1, 2006, both of which are incorporated herein by reference in its entirety.

GOVERNMENT RIGHTS

This invention was made with government support under grant number F19628-00-C-0002 awarded by the Air Force. The government has certain right in this invention.

BACKGROUND

Virtual memory systems provide a consistent memory addressing scheme for computer programs and are a common part of most operating systems on computers. They have become common because it provides a benefit for users at a very low cost. Most computers today have an insufficient amount of physical memory to simultaneously load all of the programs that most users expect to run at once. For example, if a user loads the operating system, an e-mail program, a Web browser and word processor into memory simultaneously, the computer memory may not be enough to hold it all. If there were no such thing as virtual memory, then once you filled up the available memory your computer would have to say, "Sorry, you cannot load any more applications. Please close another application to load a new one." Virtual memory systems keep track of physical memory locations that have not been used recently and copy them onto the hard disk without changing the logical, or "virtual," address of the data that was stored at that physical location. This frees up space in memory to load the new application. Moreover, this copying and address translation is performed automatically by the operating system; the user typically doesn't even know it is happening. Because hard disk space is so much cheaper than main memory, the use of virtual memory also has an economic benefit.

To facilitate copying virtual memory into physical memory, the operating system divides virtual memory into pages, each of which contains a fixed number of memory addresses. Each page is stored on a disk until it is needed. When the page is needed, the operating system copies it from disk to main memory, translating the virtual addresses into physical addresses. The copying of virtual pages from disk to main memory is known as paging or swapping.

SUMMARY

Conventional mechanisms such as those explained above suffer from a variety of deficiencies. One such deficiency is the read/write speed of a hard drive is much slower than accessing main memory, and hard drive technology is not geared toward accessing small pieces of data at a time. Virtual memory systems use a general-purpose algorithm and may not be well-suited to certain applications. If a user's system has to rely too heavily on virtual memory, the user will notice a significant performance drop. When the computer system doesn't have enough memory to handle everything the user tends to work on simultaneously and makes poor decisions about which pages of main memory to write to disk, the operating system has to constantly swap pages back and forth between memory and the hard disk. This is called thrashing, and it can make the computer run incredibly slow.

Embodiments of the invention significantly overcome such deficiencies and provide mechanisms and techniques that provide a software programming model for efficiently orchestrating the distribution and management of data across storage hierarchies using a global data abstraction.

In a particular embodiment of a method of orchestrating the distribution and management of parallel data on a parallel hierarchical storage system, the method includes providing a hierarchical map of the parallel data, the hierarchical map comprising a plurality of map objects. Each map object describes how to partition a given array of data into a plurality of subarrays of data created by a parent map object of the map object and how to store the parallel data into the parallel computer's storage hierarchy.

Other embodiments include a computer readable medium having computer readable code thereon for orchestrating the distribution and management of parallel data on a parallel hierarchical storage system. The computer readable medium includes instructions for providing a hierarchical map of the parallel data, the hierarchical map comprising a plurality of map objects. The computer readable medium further includes instructions wherein each map object describes how to partition a given array of data into a plurality of subarrays of data created by a parent map object of the map object and how to store the parallel data into the parallel computer's storage hierarchy.

Still other embodiments include a computerized device, configured to process all the method operations disclosed herein as embodiments of the invention. In such embodiments, the computerized device includes a memory system, a processor, and a communications interface in an interconnection mechanism connecting these components. The memory system is encoded with a process that provides extreme virtual memory as explained herein that when performed (e.g. when executing) on the processor, operates as explained herein within the computerized device to perform all of the method embodiments and operations explained herein as embodiments of the invention. Thus any computerized device that performs or is programmed to perform processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing extreme virtual memory as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or memory or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices, computing devices and/or software systems for such devices.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 shows how to create a vector in MATLAB, pMatlab and pMatlab XVM in accordance with embodiments of the invention;

DETAILED DESCRIPTION

Figure 1:
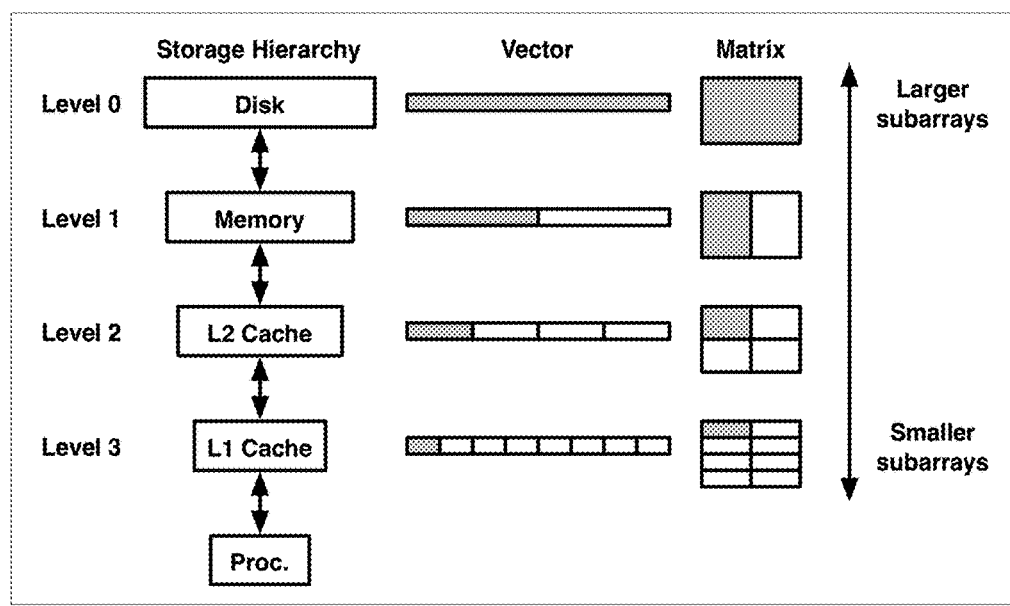
FIG. 1 shows how a hierarchical vector and matrix are partitioned into smaller subarrays at storage levels closer to the processor in accordance with embodiments of the invention.

Modern data processing applications handle increasingly larger data sets. Often, these data sets are too large to fit into a processor's main memory. There are two common approaches to addressing this problem. Both are powerful methods for processing large data sets, but also impose significant increases in programming complexity.

The first approach is to increase the amount of physical memory by using a parallel computer, which has multiple processors and memory banks. The primary difficulty in parallel programming is that each processor has its own memory address space. Programmers must explicitly partition the data set across multiple address spaces. This partitioning requires complex index calculations to determine which subset of data each processor owns. Frequently, processors must also access data that reside in other processors' address spaces, requiring programs to explicitly exchange data between processors. As a result, parallel programming is vastly different than serial programming on a single processor and is very cumbersome and difficult.

The second approach is to use out-of-core programming methods, which allow the programmer to partition data into sections that will fit into physical memory. Data primarily resides on disk storage; sections of the data are loaded in memory by the program one at a time for processing. Unlike virtual memory, which is a common technique for managing data movement between memory and disk, out-of-core methods give the application control over what sections of data to load and when. This results in higher performance. Like parallel programming, however, out-of-core technologies require a significant change in programming style and are very difficult to use. In fact, many out-of-core technologies also run on parallel computers and incur the additional complexity of parallel programming technologies. Applications increasingly require both approaches to satisfy their processing needs. The combination of these two presents a unique challenge to programmers.

eXtreme Virtual Memory (XVM) is a software programming model for efficiently orchestrating the distribution and management of data across storage hierarchies using a global data abstraction. XVM can be applied to both serial and parallel processor architectures and arbitrarily deep storage hierarchies. XVM is so named because it strives to emulate the ease-of-use of virtual memory, which transparently manages the movement of data between memory and disk.

XVM combines the Partitioned Global Address Space (PGAS) programming model with out-of-core methods. The overarching philosophy of PGAS is that programmers should not have to be parallel programming experts in order to develop parallel applications. PGAS enables applications to view multiple memory address spaces as a single global address space. In other words, PGAS allows programmers to write parallel programs that look like serial programs. XVM extends the PGAS model with out-of-core methods for all levels in the storage hierarchy. It enables applications to view the memory address spaces distributed across multiple processors and storage hierarchies on each processor as a single global address space.

XVM targets applications with arrays that are too large to fit inside a single level of storage and must be distributed across the storage hierarchies of multiple processors. This distribution is accomplished with hierarchical maps. A single map object describes how to partition a given array into multiple subarrays. A hierarchical map is composed of multiple maps; a map at level i in the hierarchical map describes how to partition subarrays created by its parent map at level i-1. Maps also describe what data distribution (i.e. block, cyclic or block-cyclic) to use when partitioning the subarrays.

Array constructors accept dimension sizes and a hierarchical map to create a hierarchical array. Hierarchical arrays provide a single, global view of data that are distributed throughout a parallel computer's address space via a PGAS interface. Hierarchical arrays have a tree-like structure; each level in the array is assigned to a level in the parallel computer's storage hierarchy. FIG. 1 shows how a hierarchical vector and matrix are partitioned into smaller subarrays at storage levels closer to the processor. The map at level i in the hierarchical map describes how to partition data at level i in the hierarchical array. Processors access subarrays at the bottom level in the hierarchical array, known as leaf subarrays, one subarray at a time. XVM uses out-of-core techniques to manage the movement of data between adjacent levels in the storage hierarchy. When a processor is finished with a leaf subarray, XVM saves the subarray data into the parent subarray, then loads the data for the next leaf subarray. Each storage level partitions an array into subarrays. Levels closer to the processor partition arrays into smaller subarrays. Only one subarray resides in the associated level of storage at a time.

Figure 2:
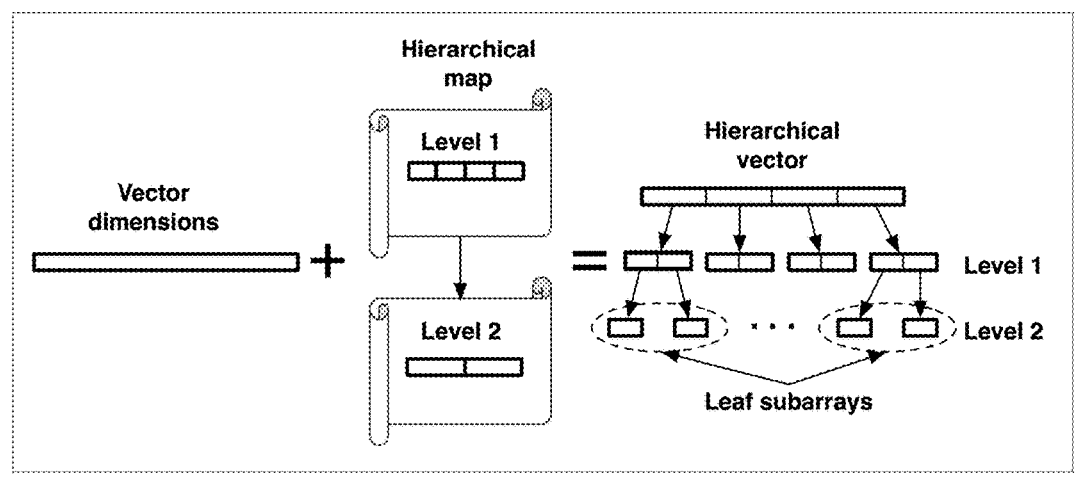
FIG. 2 show examples of how array dimension information and a hierarchical map are used to construct a hierarchical vector in accordance with embodiments of the invention.
Figure 3:
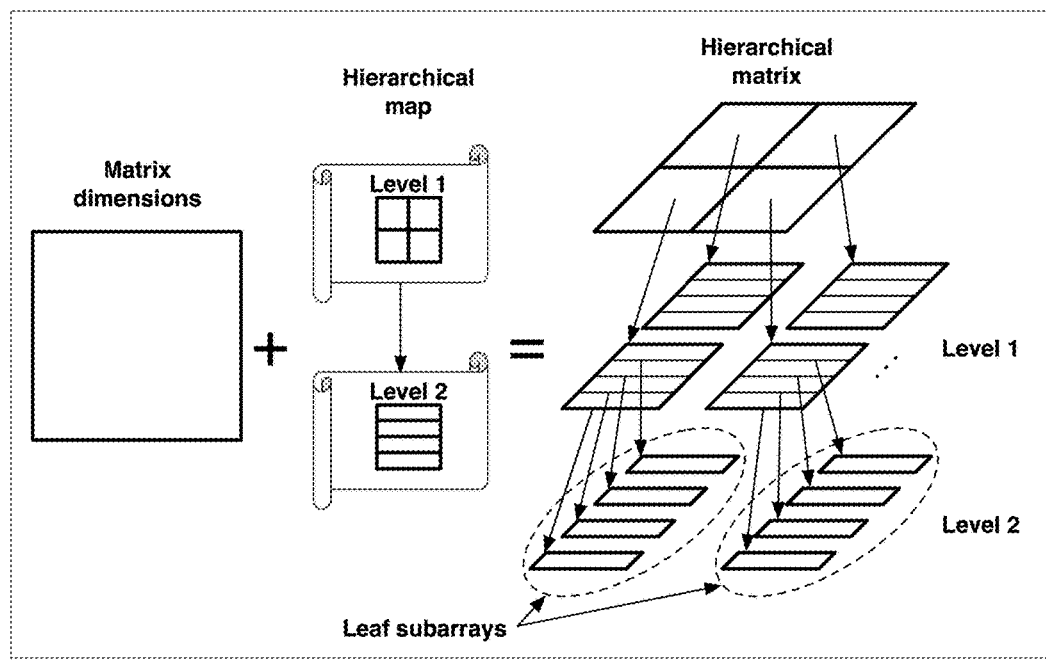
FIG. 3 show examples of how array dimension information and a hierarchical map are used to construct a hierarchical matrix in accordance with embodiments of the invention.

FIG. 2 and FIG. 3 show examples of how array dimension information and a hierarchical map are used to construct a hierarchical vector and matrix, respectively.

Hierarchical maps allow programmers to implicitly describe how to distribute data, rather than explicitly partition data as required by current technologies. Maps insulate the algorithm implementation from the specific data distribution. Consequently, simply changing the hierarchical map, without modifying the implementation of the algorithm, can change the distribution of data.

In some situations, movement of data between storage levels is unnecessary. XVM introduces data movement policies that can be set dynamically for each hierarchical array to adjust to different access patterns for optimal read and write performance. These data movement policies can be set to prevent movement of data between storage levels. Consider a hierarchical array, A, whose subarrays are each loaded, processed, then used in a subsequent calculation whose results are stored in another array, B. Only the data in B are needed; the contents of A do not need to be saved. Consequently, the data movement policies for A can be configured such that when its next subarray is loaded, the contents of the current subarray are not saved into the parent subarray, thus improving performance.

In summary, the XVM programming model provides several advantages and improvements over existing methods. One advantage is the ability to view all storage on a system as a single global address space using hierarchical arrays. Another advantage is the ability to insulate the algorithm from the specific mapping of data to processors and storage hierarchies using hierarchical maps. Still another advantage is the ability to dynamically customize data movement policies on a per array object level for optimal performance. Yet another advantage is the ability to leverage both parallel and out-of-core programming techniques without expertise in either field or sacrificing performance.

The XVM programming model can be applied to a range of applications, including applications where data sizes are larger than the total amount of physical memory, applications requiring high performance on traditional microprocessor architectures, and applications for emerging multi-core microprocessor architectures. XVM can be applied to each of these areas individually. However, system development can leverage all of these application areas within an entire development process that spans algorithm development, application prototyping and system implementation.

MATLAB® developed by The Mathworks, Inc., is the dominant programming language and development environment for implementing numerical computations and is widely used for algorithm development, simulation, data reduction, testing and system evaluation. MATLAB's popularity is driven by the high productivity users achieve because one line of MATLAB code can typically replace ten lines of C or Fortran code.

pMatlab is a PGAS library for MATLAB that provides parallel arrays and functions, allowing users to parallelize their programs with little effort. pMatlab achieves this by transparently distributing data across multiple processors using maps. pMatlab XVM is the first implementation of the XVM programming model. It expands pMatlab's capabilities, letting MATLAB programmers construct hierarchical arrays that span physical memory and disk storage with minimal modifications to MATLAB code. This greatly increases the sizes of problems that can be addressed with a minimal amount of effort. For example, a 64 Gigapoint (1 TB) complex FFT has been demonstrated using pMatlab XVM.

Figure 5:
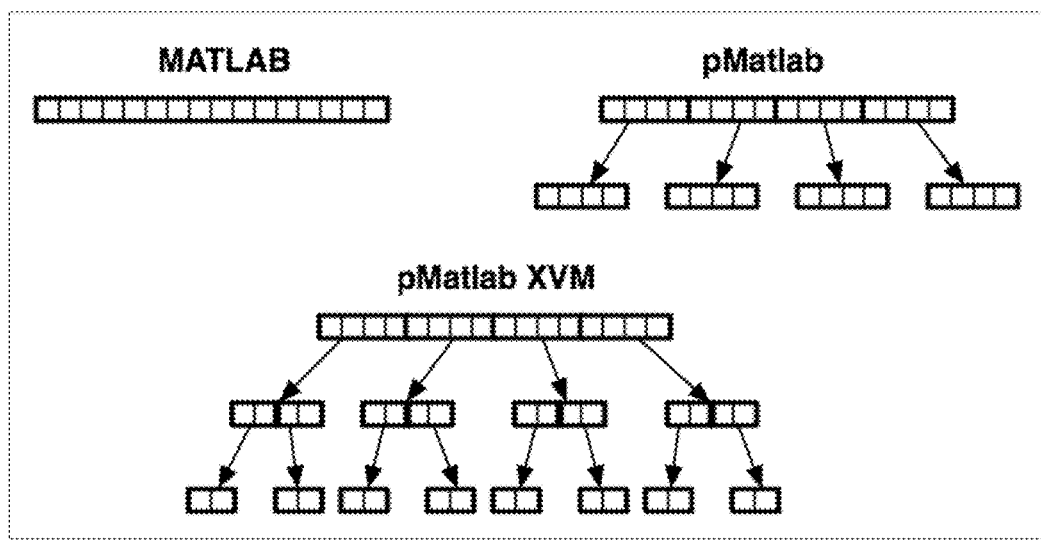
FIG. 5 graphically depicts three vectors created in MATLAB, pMatlab and pMatlab XVM in accordance with embodiments of the invention.

FIG. 4 shows how to create a vector in MATLAB, pMatlab and pMatlab XVM. The MATLAB code constructs a 16 element vector of 0s. Bold text indicates the additions required to create a parallel array in pMatlab and a hierarchical array in pMatlab XVM. The pMatlab code constructs a map object, global_map, which describes how to distribute the vector. The first argument to the map constructor, [4 1], distributes the vector across 4 processors. The second argument, { }, sets the default data distribution, i.e. block. The third argument, 0:3, places the vector on processors 0 through 3. The pMatlab XVM code constructs an additional map, ooc_map that describes how data on each processor should be divided into subarrays that reside on disk. The first argument, [2 1], distributes the data on each processor into 2 subarrays. The second two arguments, two sets of { }, set the data distribution and data movement policies to their default values. Finally, the map constructor for global_map accepts ooc_map, resulting in a hierarchical map. FIG. 5 graphically depicts the three vectors.

Figure 6:
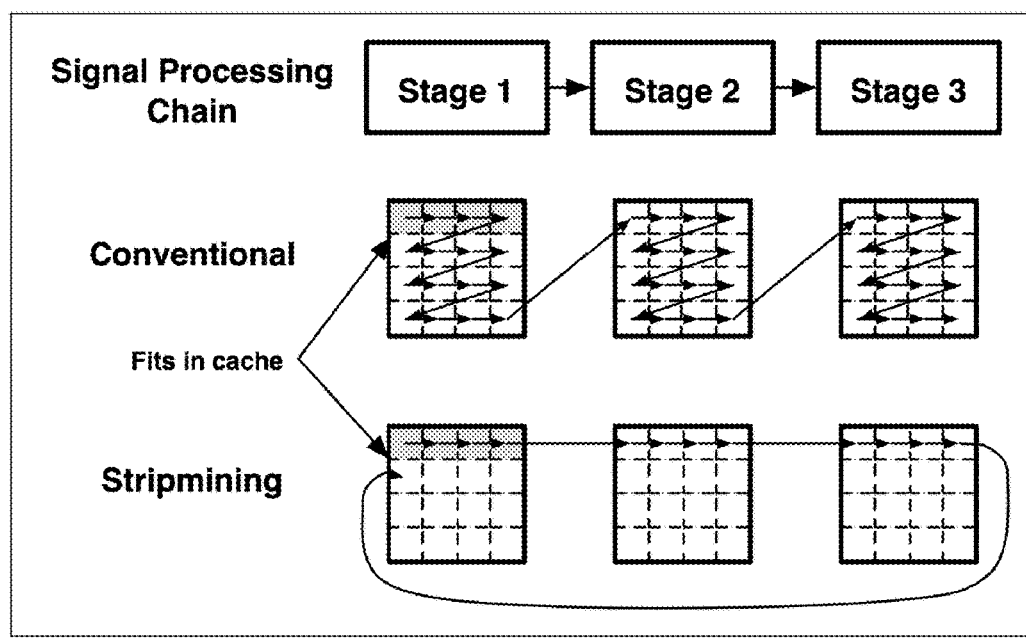
FIG. 6 shows the difference between conventional and strip mining data access patterns.

The XVM model can be applied to high performance embedded computing (HPEC) systems. For example, a common optimization technique is data strip mining. FIG. 6 shows the difference between conventional and strip mining data access patterns. Many signal processing algorithms are composed of a chain of operations that processes a set of data in sequence, e.g. video frames. Usually, frames are much larger than the cache size. Instead of applying each operation in sequence to an entire frame, the frame is broken into sections that fit inside of cache. The entire processing chain is applied to a single section, then repeated for each section. Each section of data remains in cache throughout the entire processing chain, greatly improving performance.

Today, strip-mining is implemented by hand; the programmer carefully computes the size of a section of data that can fit into cache, then manipulates pointers into an array when iterating over the data set. XVM provides a vastly simpler mechanism for implementing strip mining. Programmers can construct hierarchical arrays containing subarrays sized to fit inside cache. Additionally, XVM provides a simple interface for iterating over subarrays, which loads new data into cache to be processed.

The C++ implementation of the Vector Signal and Image Processing Library (VSIPL++) is an industry standard PGAS library targeted towards both serial and parallel HPEC systems. Like pMatlab, VSIPL++ adds parallelism to serial programs using maps. A VSIPL++ XVM library can be created, which would extend VSIPL++ with the XVM model to support hierarchical arrays, enabling programmers to easily leverage cache optimization techniques, such as strip mining.

Figure 7:
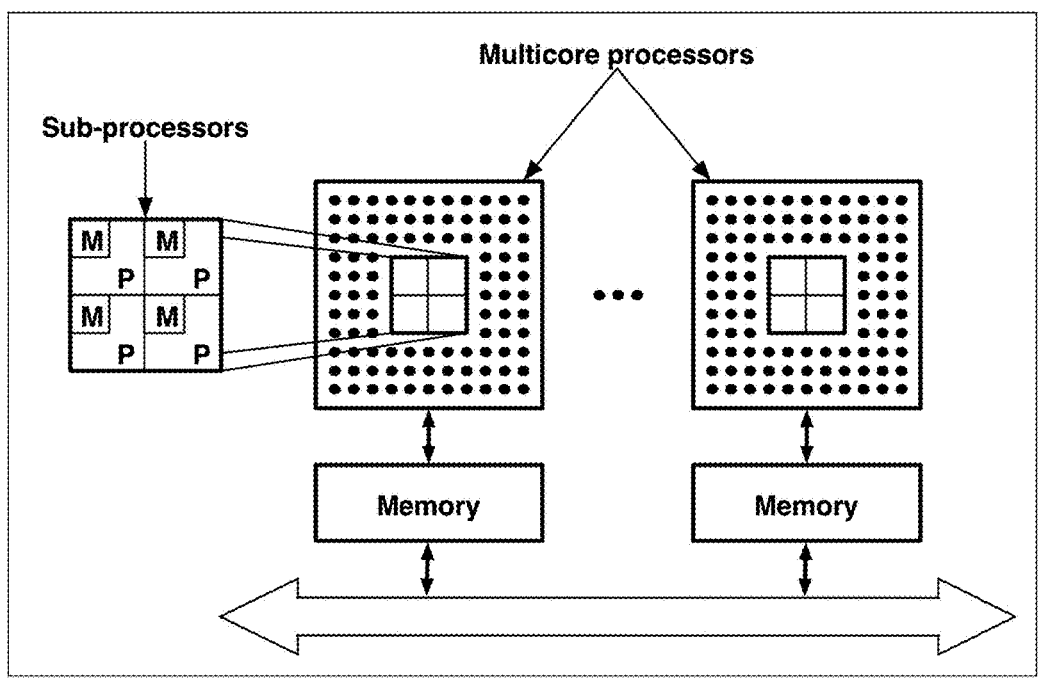
FIG. 7 depicts an example of a parallel, multicore processor system.

FIG. 7 depicts an example of a parallel, multicore processor system. Processor vendors are increasingly designing multicore architectures that employ multiple processors on a single chip to increase performance. However, each vendor has a different programming interface, resulting in programmers having to learn a new API for each vendor. Additionally, different vendor API's implement different programming models, ranging from threads to remote procedure calls to programming language extensions. This proliferation of API's and programming models is a significant obstacle towards the adoption of multicore architectures.

The XVM programming model is a natural fit for programming multicore processors. Typically, each sub-processor has its own small bank of local memory; multiple sub-processors share a larger bank of main memory. XVM can be used to construct hierarchical arrays that are distributed across multiple multicore processors. On each multicore processor, data are distributed across multiple sub-processors and span sub-processors' local and main memory to create a single, global address space across multicore processors. Using hierarchical arrays significantly reduces the barrier to learning to program multicore processors.

The VSIPL++ XVM library proposed in the previous section could also be implemented for multicore architectures. Implementing VSIPL++ XVM on different multicore architectures would provide a uniform interface to various vendor libraries. This would simultaneously enhance the programmability of multicore architectures and lower the barrier to implementing applications on multicore processors.

Developing any microprocessor-based system follows the same basic process. The following describes the different software and hardware requirements for each stage:

Algorithm development—Develop and verify the data processing algorithms. A high productivity software environment that enables rapid prototyping is desirable. Any hardware that can run the software environment can be used.

Application prototyping—Prototype the data processing application. Usually uses the same programming language as the final implementation. Typically there are only a few target hardware platforms available during development. The solution is to develop on a surrogate hardware platform.

System implementation—Implement the application on the target platform. Despite using the same programming language as in application prototyping, this stage requires resolving differences between the surrogate and target platforms.

Figure 8:
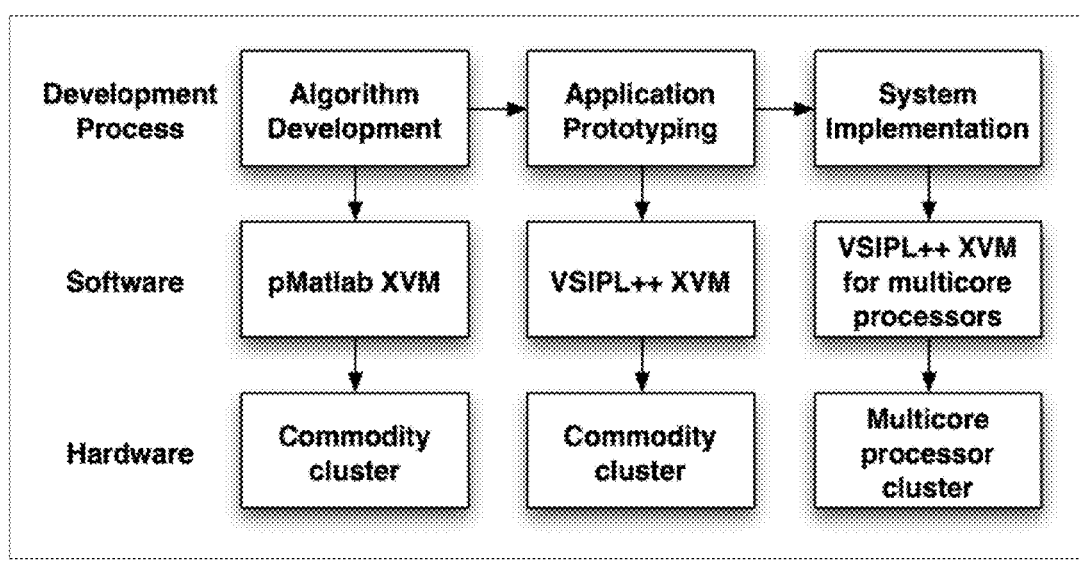
FIG. 8 shows each stage and the associated software and hardware environments in accordance with embodiments of the invention.

XVM can be applied to all of these stages when developing a multicore processor-based system. Consider developing a system based on IBM's Cell Broadband Engine Architecture. Algorithms are developed and verified in pMatlab XVM. Once algorithm development is complete, the application is prototyped on a cluster of PowerPC-based computers, for example. The prototype is written using a PowerPC implementation of the VSIPL++ XVM library. Finally, the application is ported to the target platform, using a Cell implementation of the VSIPL++ XVM library. FIG. 8 shows each of these stages and the associated software and hardware environments.

This development process is a significant departure from current methods of developing microprocessor-based systems for two reasons. First, every stage of the process uses the XVM programming model. As a result, applications developed in each share structural similarities, simplifying the transition between stages. Using pMatlab XVM and VSIPL++ XVM in algorithm development and application prototyping can transition both the algorithms and data structures of the algorithms transitioned into the prototype. Using VSIPL++ XVM in both application prototyping and system implementation greatly simplifies porting the application to the target platform.

Figure 9:
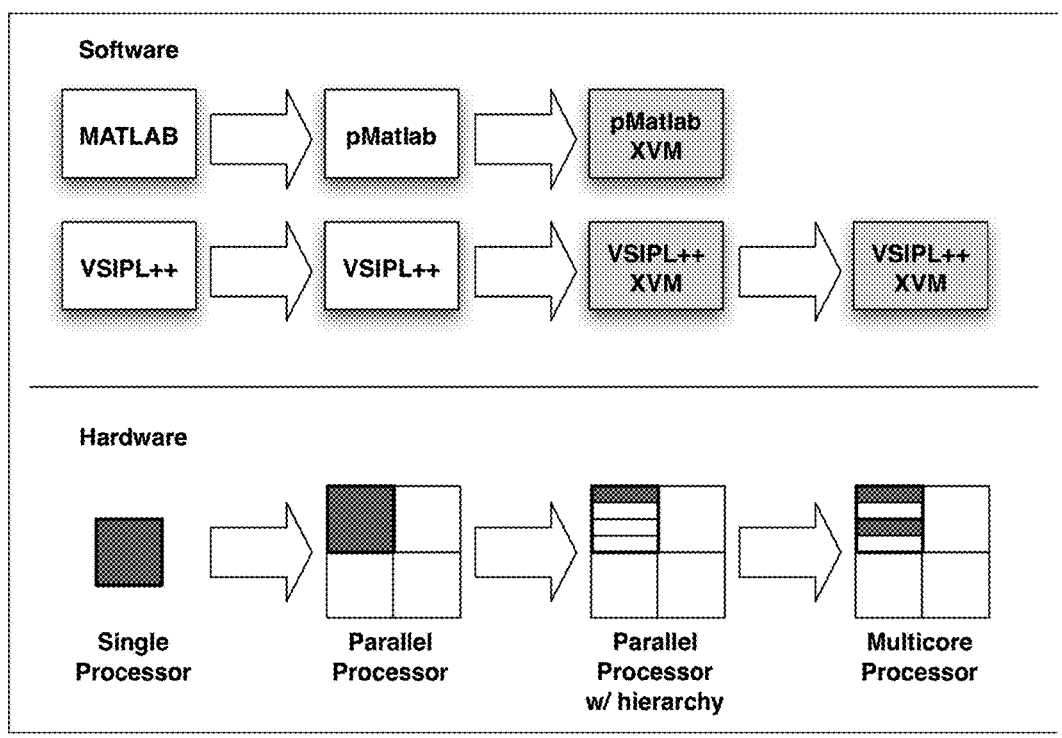
FIG. 9 shows how gradually adding parallelism and hierarchy to applications allows the developer to transition from a single processor to progressively more parallel hardware in accordance with embodiments of the invention.

Second, XVM inherently enables the ability to gradually add parallel and hierarchical structure without rewriting the application. Programmers can initially develop serial programs, add parallelism with maps, and then add hierarchy with hierarchical maps. For example, the algorithms are first developed in MATLAB, parallelized by adding pMatlab maps, and then made hierarchical by adding pMatlab XVM hierarchical maps. The prototype and final applications can be first written in serial using VSIPL++, parallelized by adding VSIPL++ maps, then made hierarchical by adding VSIPL++ XVM hierarchical maps. FIG. 9 shows how gradually adding parallelism and hierarchy to applications allows the developer to transition from a single processor to progressively more parallel hardware.

Figure 10:
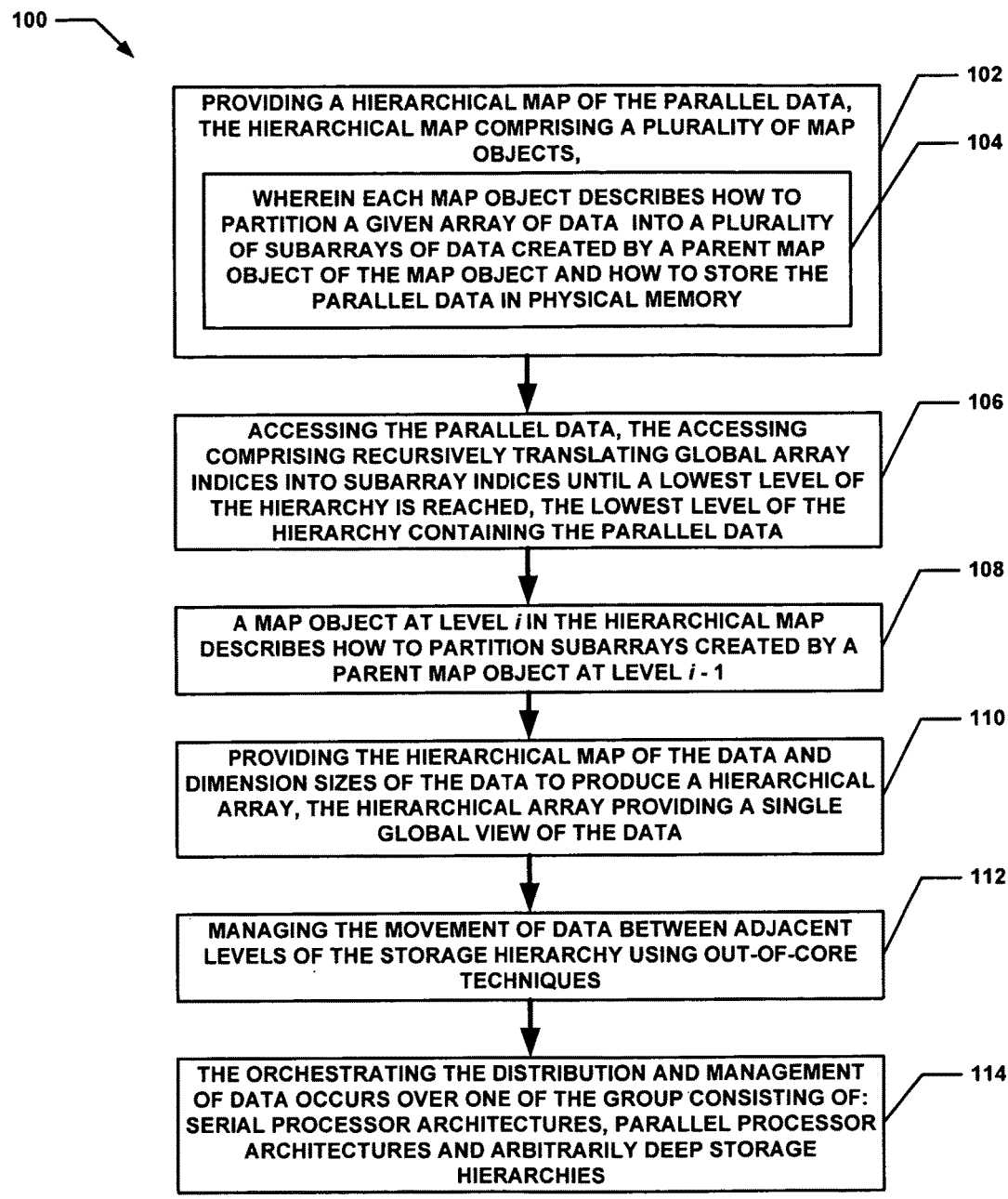
FIG. 10 depicts a flow diagram of a particular embodiment of a method of orchestrating the distribution and management of parallel data on a parallel hierarchical storage system in accordance with embodiments of the invention.
Figure 11:
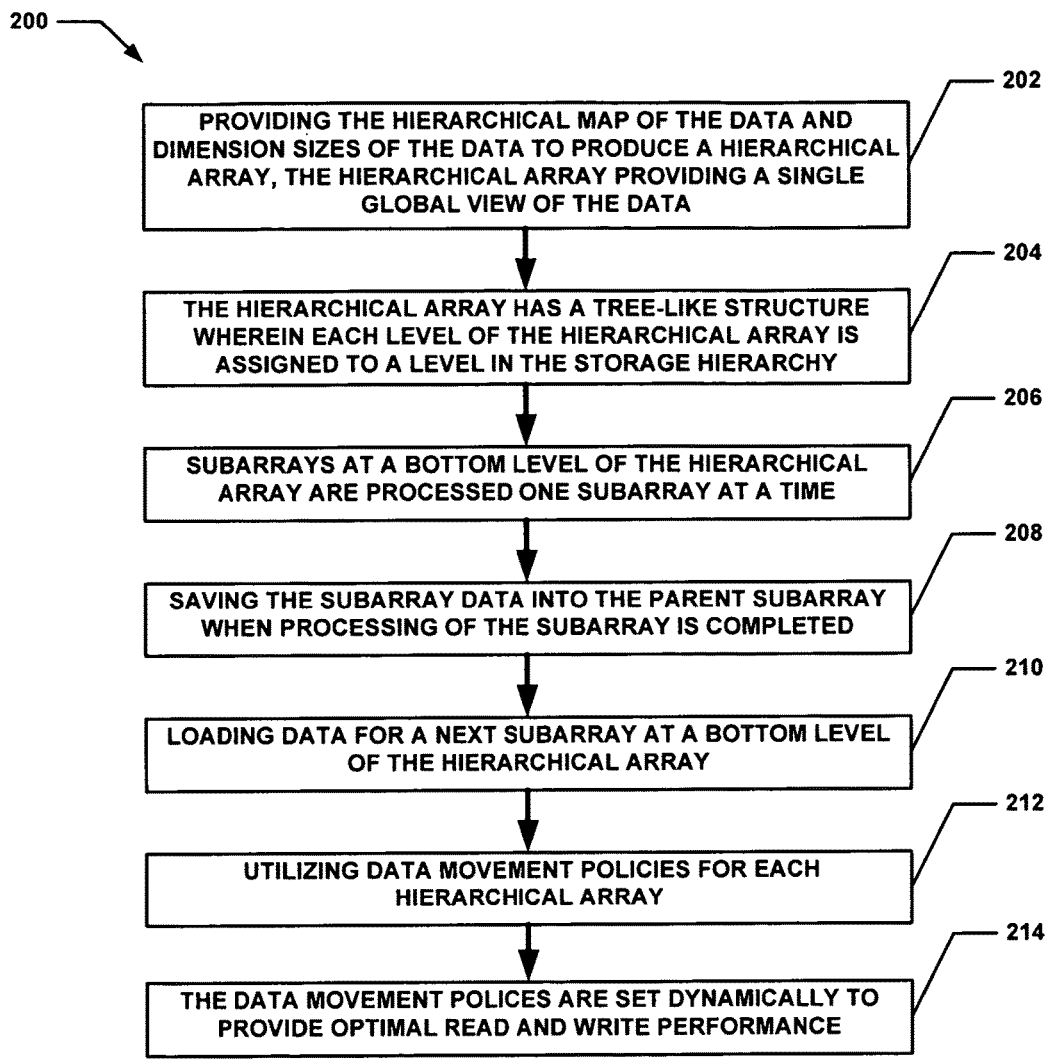
FIG. 11 depicts a flow diagram of a particular embodiment of a method of providing a hierarchical map of parallel data in accordance with embodiments of the invention.

Flow diagrams of the presently disclosed methods are depicted in FIGS. 10 and 11. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 10, a particular embodiment of a method 100 of orchestrating the distribution and management of parallel data on a parallel hierarchical storage system is shown. The method 100 begins with processing block 102, which discloses providing a hierarchical map of the parallel data, the hierarchical map comprising a plurality of map objects. As further recites in processing block 104, each map object describes how to partition a given array of data into a plurality of subarrays of data created by a parent map object of the map object and how to store the parallel data into the parallel computer's storage hierarchy.

Processing block 106 states accessing the parallel data, the accessing comprising recursively translating global array indices into subarray indices until a lowest level of the hierarchy is reached, the lowest level of the hierarchy containing the parallel data.

Processing block 108 recites a map object at level i in the hierarchical map describes how to partition subarrays created by a parent map object at level i-1. Maps also describe what data distribution (i.e. block, cyclic or block-cyclic) to use when partitioning the subarrays. Hierarchical maps allow programmers to implicitly describe how to distribute data, rather than explicitly partition data as required by current technologies. Maps insulate the algorithm implementation from the specific data distribution.

Processing continues with processing block 110, which discloses providing the hierarchical map of the data and dimension sizes of the data to produce a hierarchical array, the hierarchical array providing a single global view of the data. Hierarchical arrays have a tree-like structure; each level in the array is assigned to a level in the parallel computer's storage hierarchy.

Processing block 112 states managing the movement of data between adjacent levels of the storage hierarchy using out-of-core techniques. XVM uses out-of-core techniques to manage the movement of data between adjacent levels in the storage hierarchy. When a processor is finished with a leaf subarray, XVM saves the subarray data into the parent subarray, then loads the data for the next leaf subarray.

Processing block 114 discloses wherein the orchestrating the distribution and management of data occurs over one of the group consisting of: serial processor architectures, parallel processor architectures and arbitrarily deep storage hierarchies.

Referring now to FIG. 11, a particular method of producing and utilizing a hierarchical array is depicted. The method 200 begins with processing block 202, which discloses providing the hierarchical map of the data and dimension sizes of the data to produce a hierarchical array, the hierarchical array providing a single global view of the data. Hierarchical arrays have a tree-like structure; each level in the array is assigned to a level in the parallel computer's storage hierarchy.

Processing block 204 states the hierarchical array has a tree-like structure wherein each level of the hierarchical array is assigned to a level in the storage hierarchy. Processing block 206 discloses wherein subarrays at a bottom level of the hierarchical array are processed one subarray at a time.

Processing block 208 states saving the subarray data into the parent subarray when processing of the subarray is completed. Processing block 210 recites loading data for a next subarray at a bottom level of the hierarchical array.

Processing block 212 discloses utilizing data movement policies for each hierarchical array. Processing block 214 states the data movement polices are set dynamically to provide optimal read and write performance.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer implemented method comprising:
    in a hierarchical storage system associated with parallel processors, the storage system comprising a plurality of hierarchical levels of storage arranged based on storage capacity and proximity to the processors, a base level comprising persistent storage, having greatest storage capacity and being furthest from the processors:
    representing, by a computer, an address space associated with the hierarchical storage system as a plurality of hierarchical maps, wherein each map is uniquely associated with one of the hierarchical levels of storage, an array of data is associated with a map of the base level, and for each level of storage other than the base level the uniquely associated map describes how to partition the array of data into a plurality of subarrays of data each of a size that can be accommodated by the storage capacity of storage at the level, the size of the subarrays decreasing at each successive level from a level that is closest to the base level to a level that is closest to the processors, a first map designating a first one of block, cyclic and block-cyclic data distribution and a second map designating a different one of said block, cyclic and block-cyclic data distribution; and
    utilizing a selected one of the hierarchical maps to select one of the subarrays to select a page of data to write into the level of storage uniquely associated with the selected map.

2. The method of claim 1 further comprising one of the parallel processors accessing a page of parallel data associated with the hierarchical storage system by recursively translating array indices into subarray indices until a lowest level is reached.

3. The method of claim 1 further comprising one of the processors utilizing a map at level i in said hierarchical maps, where the map at level i describes how to partition subarrays created by a parent map object at level i-1.

4. The method of claim 1 comprising organizing the array and subarrays in a tree-like structure wherein each level is assigned to one of the levels of storage of one of the parallel processors.

5. The method of claim 4 comprising processing subarrays at a bottom level one subarray at a time.

6. The method of claim 1 further comprising managing, by a computer, the movement of data between adjacent levels of said storage hierarchy using out-of-core techniques.

7. The method of claim 1 comprising the maps designating a data distribution technique to use when partitioning the subarrays.

8. A non-transitory computer readable medium having computer readable code thereon, the medium comprising:
    instructions that generate a representation of an address space associated with a hierarchical storage system comprising a plurality of hierarchical levels of storage arranged based on storage capacity and proximity to parallel processors, a base level comprising persistent storage, having greatest storage capacity and being furthest from the processors, the representation comprising a plurality of hierarchical maps, wherein each map is uniquely associated with one of the hierarchical levels of storage, an array of data is associated with a map of the base level, and for each level of storage other than the base level the uniquely associated map describes how to partition the array of data into a plurality of subarrays of data each of a size that can be accommodated by the storage capacity of storage at the level, the size of the subarrays decreasing at each successive level from a level that is closest to the base level to a level that is closest to the processors;

instructions responsive to a first map designating a first one of block, cyclic and block-cyclic data distribution and a second map designating a different one of said block, cyclic and block-cyclic data distribution to utilize the respective designated distribution for the first and second maps; and instructions that utilize a selected one of the hierarchical maps to select one of the subarrays to select a page of data to write into the level of storage uniquely associated with the selected map.

9. The computer readable medium of claim 8 comprising instructions that cause one of the parallel processors to access a page of parallel data associated with the hierarchical storage system by recursively translating global array indices into subarray indices until a lowest level is reached.

10. The computer readable medium of claim 8 further comprising instructions that utilize a map at level i in said hierarchical maps, where the map at level i describes how to partition subarrays created by a parent map object at level i-1.

11. The computer readable medium of claim 8 comprising instructions that organize the array and subarrays in a tree-like structure wherein each level is assigned to one of the levels of storage of one of the parallel processors.

12. The computer readable medium of claim 11 further comprising instructions that process subarrays at a bottom level one subarray at a time.

13. The computer readable medium of claim 8 further comprising instructions for managing the movement of data between adjacent levels of said parallel hierarchical storage system using out-of-core techniques.

14. The computer readable medium of claim 8 further comprising instructions responsive to a designation in the maps to select a data distribution technique to use when partitioning the subarrays.

15. A computer system comprising:
parallel processors;
a hierarchical storage system associated with the parallel processors, the storage system comprising a plurality of hierarchical levels of storage arranged based on storage capacity and proximity to the processor, a base level comprising persistent storage, having greatest storage capacity and being furthest from the processors;
a communications interface;
an interconnection mechanism coupling the hierarchical storage system, the processors and the communications interface; and
an application stored on a non-transitory computer-readable medium that represents an address space associated with the hierarchical storage system as a plurality of hierarchical maps, wherein each map is uniquely associated with one of the hierarchical levels of storage, an array of data is associated with a map of the base level, and for each level of storage other than the base level the uniquely associated map describes how to partition the array of data into a plurality of subarrays of data each of a size that can be accommodated by the storage capacity of storage at the level, the size of the subarrays decreasing at each successive level from a level that is closest to the base level to a level that is closest to the processors, wherein a first map uses a first one of block, cyclic and block-cyclic data distribution and wherein a second map uses a different one of said block, cyclic and block-cyclic data distribution; and
utilizes a selected one of the hierarchical maps to select one of the subarrays to select a page of data to write into the level of storage uniquely associated with the selected map.

16. The method of claim 1 comprising loading a next subarray of said plurality of subarrays where contents of a current subarray are not needed, and not saving said current subarray with a parent subarray.

17. The computer readable medium of claim 8 further comprising instructions that load a next subarray of said plurality of subarrays where contents of a current subarray are not needed, and do not save said current subarray with a parent subarray.

* * * * *